US007023661B2

(12) United States Patent
Tahara

(10) Patent No.: US 7,023,661 B2
(45) Date of Patent: Apr. 4, 2006

(54) MAGNETIC TAPE CARTRIDGE, MAGNETIC TAPE DRIVE FOR RECORDING, AND MAGNETIC TAPE DRIVE FOR REPRODUCING

(75) Inventor: Hiroyuki Tahara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 282 days.

(21) Appl. No.: 10/442,178

(22) Filed: May 21, 2003

(65) Prior Publication Data

US 2004/0012876 A1 Jan. 22, 2004

(30) Foreign Application Priority Data

May 21, 2002 (JP) ............................ 2002-146578

(51) Int. Cl.
*G11B 23/30* (2006.01)

(52) U.S. Cl. ........................................ 360/132; 360/69

(58) Field of Classification Search ................ 360/132, 360/69, 55, 133, 137; 242/348–348.3, 347; 380/277, 264, 270, 42

See application file for complete search history.

(56) References Cited

U.S. PATENT DOCUMENTS 5,784,227 A * 7/1998 Kitamura et al. ........... 360/132
5,852,534 A * 12/1998 Ozue et al. ................... 360/69

FOREIGN PATENT DOCUMENTS

| | | | | |
|---|---|---|---|---|
| JP | 06060602 | A | * | 3/1994 |
| JP | 06349243 | A | * | 12/1994 |
| JP | 07014346 | A | * | 1/1995 |
| JP | 07073648 | A | * | 3/1995 |
| JP | 09265759 | A | * | 10/1997 |
| JP | 2002-140879 | A | * | 5/2002 |

* cited by examiner

*Primary Examiner*—William J Klimowicz
(74) *Attorney, Agent, or Firm*—Sughrue Mion, PLLC

(57) ABSTRACT

A magnetic tape cartridge, in which a cartridge memory including a semiconductor memory device is detachably attached. This semiconductor memory device holds the data, such as information, which denotes a unique identification data that is endemic to the cartridge memory, therein. This data is read and written by an external device in a contactless manner.

13 Claims, 4 Drawing Sheets

MAGNETIC TAPE CARTRIDGE, MAGNETIC TAPE DRIVE FOR RECORDING, AND MAGNETIC TAPE DRIVE FOR REPRODUCING

BACKGROUND OF THE INVENTION

1. Field of the Invention

The present invention relates to a magnetic tape cartridge, and a magnetic tape drive used for recording or reproducing of data on a magnetic tape accommodated in the magnetic tape cartridge.

2. Description of Relevant Art

In recent years, a magnetic tape cartridge has been often used not only as a recording medium of picture, music, or the like, but also as a backup storage in computers for recording extremely classified data such as transaction data of banks and design drawings of manufactures. Thereby, management and protection of data recorded on the magnetic tape cartridge has been strictly important.

In the conventional magnetic tape cartridge, a cartridge memory, which is used for storing the data for administrative use, is fixed within the magnetic tape cartridge.

This cartridge memory includes IC tip (not shown) as a main body. The IC tip is a semiconductor device having a thin rectangular shape. As shown in a plan view of FIG. 2B, the IC tip (not shown) is enclosed in a globe top made of plastic sealant, The IC tip is connected to a loop antenna printed on a base plate The cartridge memory, as a semiconductor memory device, can receive electric power and signals due to an electromagnetic induction capacity of itself. The cartridge memory is accommodated in a cartridge case of the magnetic tape cartridge in a way that said cartridge memory is not detachable from the cartridge case.

In the conventional magnetic tape cartridge, however, the data to be stored in the cartridge memory has been limited to the data for administrative use. If this cartridge memory can handle the data for another use in addition to the data for administrative use, the utility of the magnetic tape cartridge having this cartridge memory can be improved.

SUMMARY OF THE INVENTION

The present invention related to a magnetic tape cartridge. In this magnetic tape cartridge, a cartridge memory including a semiconductor memory device is detachably attached. This semiconductor memory device holds the data, such as information, which denotes a unique identification number that is endemic to the cartridge memory, therein. This data is read and written by an external device in a contactless manner.

In this magnetic tape cartridge, it is preferable that the recording or reproducing of data on the magnetic tape is performed utilizing the unique identification number stored in the cartridge memory as a cryptographic key. Thereby, since the cartridge memory is detachable, the security of the data in the magnetic tape MT can be improved, if the cartridge memory and the magnetic tape MT are separately treasured. This is because the data recorded on the magnetic tape cannot reproduce without the cartridge memory.

DETAILED DESCRIPTION OF THE PREFERRED EMBODIMENT

A preferred embodiment of the present invention will be now described in detail with reference to the accompanied drawings.

First Embodiment

In this embodiment, the magnetic tape cartridge and the magnetic tape drive according to the present invention will be described.

Figure 1A:
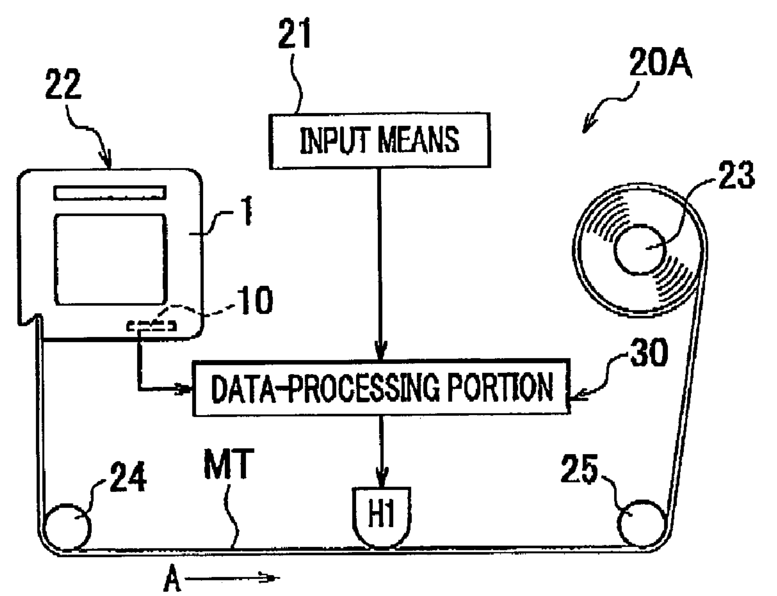
FIG. 1A is a conceptual front view showing a recording magnetic tape drive regarding the first embodiment of the present invention.
Figure 1B:
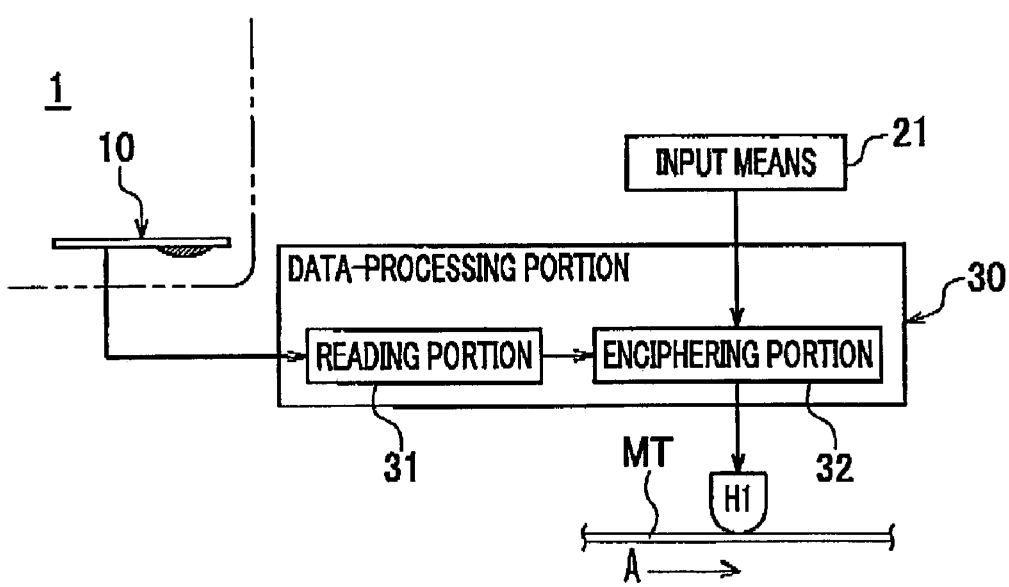
FIG. 1B is a block diagram showing a schematic view of a data-processing portion.
Figure 2A:
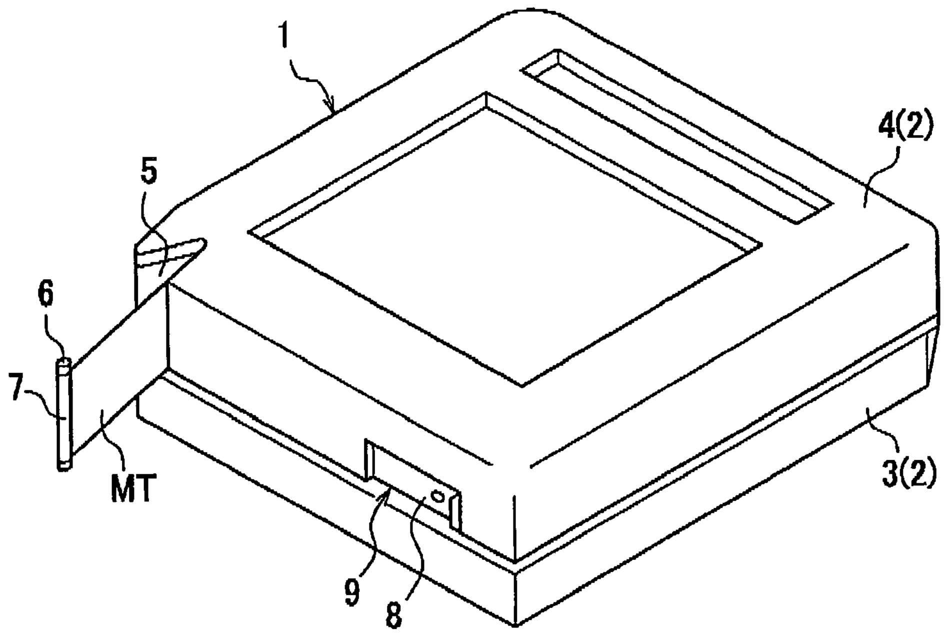
FIG. 2A is a perspective view showing a magnetic tape cartridge regarding the embodiment of the present invention.
Figure 2B:
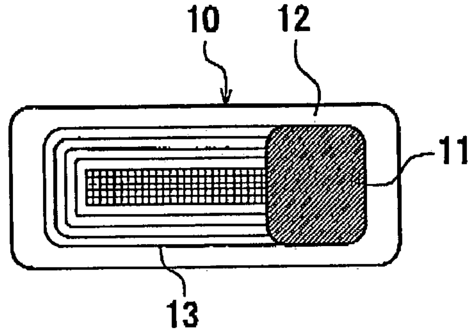
FIG. 2B is a plan view showing a cartridge memory accommodated in the magnetic tape cartridge.
Figure 3A:
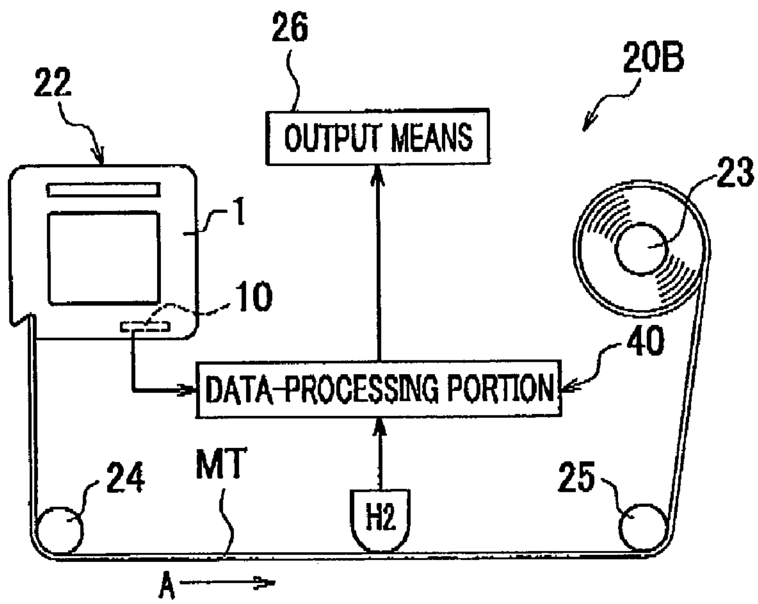
FIG. 3A is a conceptual front view showing a reproducing magnetic tape drive regarding 'the first embodiment of the present invention.
Figure 3B:
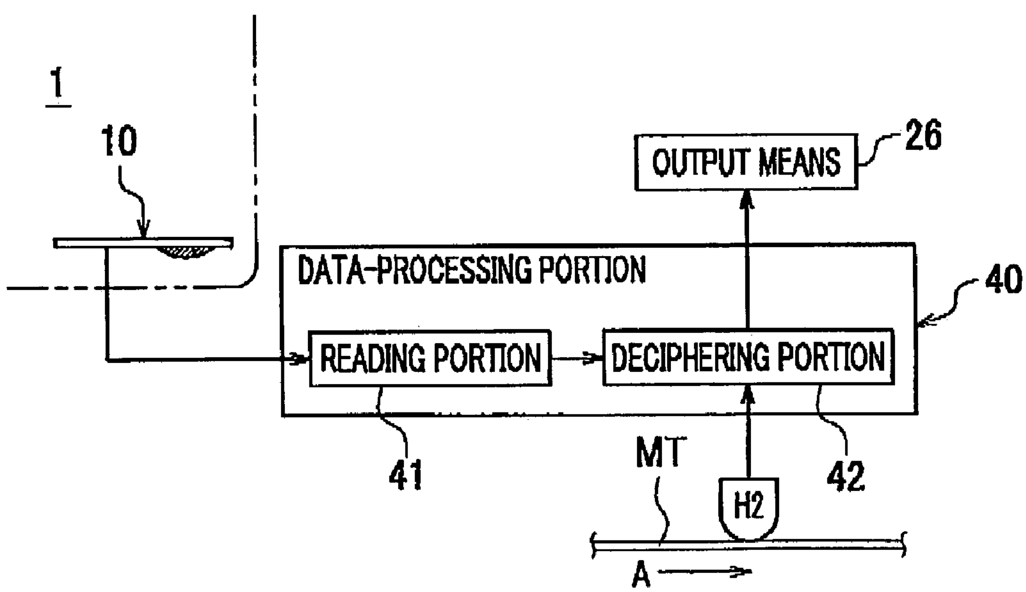
FIG. 3B is a block diagram showing a schematic view of a data-processing portion.

FIG. 1A is a conceptual front view showing a recording magnetic tape drive regarding the first embodiment of the present invention. FIG. 1B is a block diagram showing a schematic view of a data-processing portion. FIG. 2A is a perspective view showing a magnetic tape cartridge regarding the embodiment of the present invention. FIG. 2B is a plan view showing a cartridge memory being accommodated in the magnetic tape cartridge. FIG. 3A is a conceptual front view showing a reproducing magnetic tape drive regarding the first embodiment of the present invention. FIG. 3B is a block diagram showing a schematic view of a data-processing portion.

[Magnetic Tape Cartridge]

The magnetic tape cartridge, which is used in this embodiment's magnetic tape drive, will be explained.

As shown in FIG. 2A, the magnetic tape cartridge 1 is composed of a lower half case 3 and an upper half case 4. The lower half case 3 and the upper half case 4 are joined together to form a rectangular shaped box cartridge case 2.

In this magnetic tape cartridge 1, a magnetic tape MT and a cartridge memory 10 are stored. Here, the magnetic tape MT is being wound around a reel (not shown).

A pull-out portion 5, from which a magnetic tape MT stored in the magnetic tape cartridge 1 is drawn out, is provided in one corner of the magnetic tape cartridge 1. Since a leader pin 6 clamped at one end of the magnetic tape MT by a clip 7 is hooked on this pull-out portion, the magnetic tape MT stored in the magnetic tape cartridge 1 is easily drawn out through the pull-out portion 5. In other words, the leader pin 6 is used as a knob by which the draw out of the magnetic tape MT is easily performed.

An opening portion 9 is formed on the side of the upper half case 4 of the magnetic tape cartridge 1. This opening portion 9 has an enough size for allowing the install or uninstall of the cartridge memory 10 into the magnetic tape cartridge 1. Thereby, the install or uninstall of the cartridge memory 10 through the opening portion 9 is easily performed in this embodiment's magnetic tape cartridge 1.

In this magnetic tape cartridge 1, additionally, a shutter 8, which is used to open and close the opening portion 9, is also provided in order to prevent the intrusion of dust etc.

As shown in FIG. 2B, a cartridge memory 10 is composed of a globe top 11, base plate 12, and a loop antenna 13. The base plate 12, onto which the loop antenna 13 is printed, is a rectangular shaped plate. The globe top 11, which is made of resin compounds and holds an IC tip. (not shown) therein, is also provided on the base plate 12. In this cartridge memory 10, additionally, the IC tip connects with the print antenna 13.

In this IC tip, the information including a data for administrative use and a data for an identification data is stored. In the present embodiment, this identification data is identification number (hereinafter indicated as ID number). Here, ID number is a unique identification number, which is endemic to the cartridge memory. In other words, this ID number differs by each cartridge case 2.

The processing of information, such as recording or updating or deleting of information, stored in this IC tip is performed by utilizing a non contact type data exchanging method through the loop antenna 13 in a contactless manner. In other words, the processing of information can be achieved without directly contacting the cartridge memory with a reading/recording media (external device).

In the present embodiment, the cartridge memory 10 is detachably installed in the cartridge case 1. Thus, in order to avoid the miss-installing of the cartridge memory 10 to the cartridge case 1, the same discrimination number or symbol is provided on the surface of each of the magnetic tape 1 and the cartridge memory 10, respectively. In other words, the information, which indicates the correlation between the magnetic tape cartridge 1 and said cartridge memory 10, is marked on the magnetic tape cartridge 1 and the cartridge memory 10, respectively.

[Magnetic Tape Drive for Recording]

Next, a magnetic tape drive used for recording of data (herein after indicated as a recording magnetic tape drive) according to the preset invention will be explained.

As shown in FIG. 1A, a recording magnetic tape drive 20A has an input means 21, a loading portion 22, a take-up reel 23, the data-processing portion 30, and a writing head H1.

The input means 21 connects with the output port of the computer. This input means 21 receives the data to be recorded on the magnetic tape MT, and transmits this data to the data processing portion 30.

The loading portion 22, to which the magnetic tape cartridge 1 is mounted, is positioned at the upstream side of the writing head H1. In this loading portion 22, a reel stored within the magnetic tape cartridge 1 is rotated by a servo motor (not shown) at a predetermined rotation speed. By this rotation of the reel, since the magnetic tape MT is being wound around the reel, the magnetic tape MT stored in the magnetic tape cartridge 1 is fed out from the magnetic tape cartridge 1. Then, the magnetic tape MT is fed to the writing head H1. Herein, aforementioned "upstream side" means that the upstream with respect to the traveling directions. This traveling direction of the magnetic tape MT is indicated by the arrow with symbol A in FIG. 1A.

The take-up reel 23, which winds the magnetic tape MT thereon, is positioned at the downstream of the writing head H1. The take-up reel 23 is rotated by a servomotor (not shown) at a predetermined rotation speed. Thereby, the magnetic tape MT, which is drawn out from the magnetic tape cartridge 1 and has passed through the writing head H1, is wound around the take-up reel 23. Herein, aforementioned "downstream side" means that the downstream side with respect to the traveling direction. This traveling direction of the magnetic tape MT is indicated by the arrow with symbol A in FIG. 1A.

In the recording magnetic tape drive 20A, additionally, a capstan roller 24 is provided between the writing head H1 and the loading portion 22. Additionally, a capstan roller 25 is provided between the writing head H1 and the take-up reel 23.

These capstan rollers 24 and 25 assist the traveling of the magnetic tape MT, and are also used for keeping the accuracy of the magnetic tape's position or the tension of the magnetic tape MT. Thereby, the magnetic tape MT drawn out from the magnetic tape cartridge 1 smoothly travels to a direction shown by the arrow with symbol A.

In the recording magnetic tape drive 20A, furthermore, in order to accurately record the data on the magnetic tape MT, a plurality of guide rollers can further be adoptable.

In the recording magnetic tape drive 20A, still furthermore, a tape tension-controller (not shown), which keeps the tension of the magnetic tape MT, or a tape running-controller, which adjust the traveling speed of the magnetic tape MT to a desirable speed, can be adoptable in order to achieve the recording of the data accurately.

The writing head H1 is a magnetic head. This writing head H1 records the data, which is entered through the input means 21 and has been processed in the data processing portion 30, on the magnetic tape MT.

As shown in FIG. 1B, the data-processing portion 30 has a reading portion 31 and an enciphering portion 32. This data-processing portion 30 is a computer (a microcomputer) equipped with CPU, ROM, RAM, I/O or the like.

The reading portion 31 of this data-processing portion 30 performs the readout of the information stored in the cartridge memory 10 through the loop antenna 13 utilizing a non contact type data exchanging method. Then the reading portion 31 obtains the ID number among the obtained information, and outputs this ID number to the enciphering portion 32.

The enciphering portion 32 enciphers the data entered from the input means 21, and obtains the enciphered data. In this occasion, the encipherment of the data is performed utilizing the ID number, which is entered from the reading portion 31, as a cryptographic key. Then, enciphered data are outputted to the writing head H1.

In the present embodiment, various types of enciphering methods can be adoptable as long as a common key system is utilized in order to obtain the enciphered data. For example, such as block ciphering method and a stream ciphering method, in which the same cryptographic key is used when the encipherment or decipherment is performed, can be adoptable as this enciphering method.

[Operation of the Magnetic Tape Drive for Recording]

Here, a description will be made to explain a method of recording data on the magnetic tape cartridge 1 loaded on the recording magnetic tape drive 20A.

Firstly, the cartridge memory 10 is installed within the magnetic tape cartridge 1 through the opening portion 9, and is attached at the predetermined position of the magnetic tape cartridge 1.

Then, as shown in FIG. 1A, the magnetic tape cartridge 1 is mounted on a loading portion 22 of the recording magnetic tape drive 20A. Next, the magnetic tape MT is drawn out from the magnetic tape cartridge 1, and then, the end (leader pin 6) of the magnetic tape MT is hooked on the take-up reel 23.

When the recording magnetic tape drive 20A is operated and the magnetic tape MT begins to travel, the magnetic tape MT drawn out from the magnetic tape cartridge 1 is fed to the take-up reel 23 after passing through the writing head H1.

On this occasion, the reading portion 31 performs the readout of the data stored in the cartridge memory 10 through the loop antenna 13, and obtains the ID number. Then, the reading portion 31 outputs the obtained ID number to the enciphering portion 32.

The enciphering portion 32 performs the encipherment on the data entered from the input means 21 utilizing the ID number, which is entered from the reading portion 31, as a cryptographic key. Thus, the enciphered data is obtained. Then, enciphered data is outputted to the writing head H1. Thus, the enciphered data is recorded on the magnetic tap MT.

Thereby, the magnetic tape after recording of the data is stored on the take-up reel 23 by winding the magnetic tape around the take-up reel 23.

[Magnetic Tape Drive for Reproducing]

Next, a magnetic tape drive used for reproducing of data (herein after indicated as a reproducing magnetic tape drive) according to the preset invention will be explained.

In the following explanations, the components, which are the same as that of described in the above described embodiment, are indicated by the same symbols, and brief explanation thereof will be omitted.

As shown in FIG. 3A, a reproducing magnetic tape drive 20B has an output means 26, a loading portion 22, a take-up reel 23, the data-processing portion 40, and a reading head H2.

In this reproducing magnetic tape drive 20B, the writing head H2 is positioned between the loading portion 22 and the take-up reel 23. The output means 26 connects with the input port of the computer. Herein, the reading head H2 connects with the data-processing portion 40.

As shown in FIG. 3B, the data-processing portion 40 comprises a reading portion 41 and a deciphering portion 42.

The reading portion 41 of this data-processing portion 40 performs the readout of the information stored in the cartridge memory 10 through the loop antenna 13 utilizing a non contact type data exchanging method. Then the reading portion 31 obtains the ID number among the obtained information, and outputs this ID number to the enciphering portion 32.

The deciphering portion 42 deciphers the data to be inputted from the reading head H2, and obtains the data. In this occasion, the decipherment of the data is performed utilizing the ID number, which is inputted from the reading portion 31, as a cryptographic key. Then, The deciphering portion 42 outputs the data to the output means 26.

In the present embodiment, furthermore, since the data recorded on the magnetic tape MT is enciphered by a common key enciphering system, a cryptographic key is indispensable to decipher the enciphered data.

[Operation of the Magnetic Tape Drive for Reproducing]

Next, a description will be made to explain a method of reproducing data recorded on the magnetic tape cartridge 1 being loaded on the reproducing magnetic tape drive 20B.

Firstly, the cartridge memory 10 is installed into the magnetic tape cartridge 1 through the opening portion 9, and is attached at the predetermined position of the magnetic tape cartridge 1. On this occasion, the cartridge memory 10, in which the same ID number as the ID number of the magnetic tape MT stored in the magnetic tape cartridge is recorded, is selected.

Then, as shown in FIG. 3A, the magnetic tape cartridge 1 is mounted on a loading portion 22 of the reproducing magnetic tape drive 20B. Sequentially, the magnetic tape MT is drawn out from the magnetic tape cartridge 1, and then, the end (leader pin 6) of the magnetic tape MT is hooked on the take-up reel 23.

When the reproducing magnetic tape drive 20B is operated and the magnetic tape MT begins to travel, the magnetic tape MT drawn out from the magnetic tape cartridge 1 is fed to the take-up reel 23 after passing through the reading head H2.

The reading portion 41 performs the readout of the data stored in the cartridge memory 10 through the loop antenna 13, and obtains the ID number. Then, the reading portion 31 outputs the obtained ID number to the deciphering portion 42.

The reading head H2 performs the readout of the data recorded on the magnetic tape MT and outputs the obtained data to the deciphering portion 42.

In the present embodiment, since the data to be entered from reading head H2 is an enciphered data, the deciphering portion 42 performs the decipherment using the ID number, which is entered from the reading portion 41, as the cryptographic key, and obtains the data. That is, the deciphering portion 42 obtains the data from the enciphered data entered from the reading head H2, and outputs the data to the output means 26.

In the present embodiment, since the decipherment of the enciphered data is performed using the ID number as a cryptographic key, the decipherment of the enciphered data cannot be achieved when the ID number of cartridge memory does not agree with the ID number recorded on the magnetic tape MT. Thereby, the security of the data in the magnetic tape MT can be improved, if the cartridge memory and the magnetic tape MT are stored, separately.

In this reproducing magnetic tape drive 20B, furthermore, the magnetic tape after finishing the readout of the data is stored on the take-up reel 23 by winding the magnetic tape around the take-up reel 23.

Second Embodiment

Next, the second preferred embodiment of the present invention will be explained.

Figure 4A:
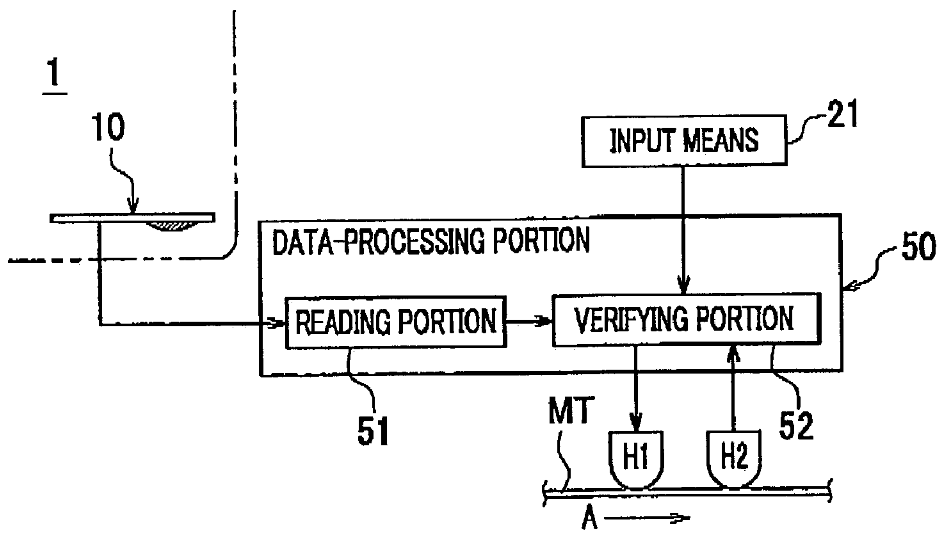
FIG. 4A is a block diagram showing a schematic view of a data-processing portion of a recording magnetic tape drive regarding the second embodiment of the present invention.
Figure 4B:
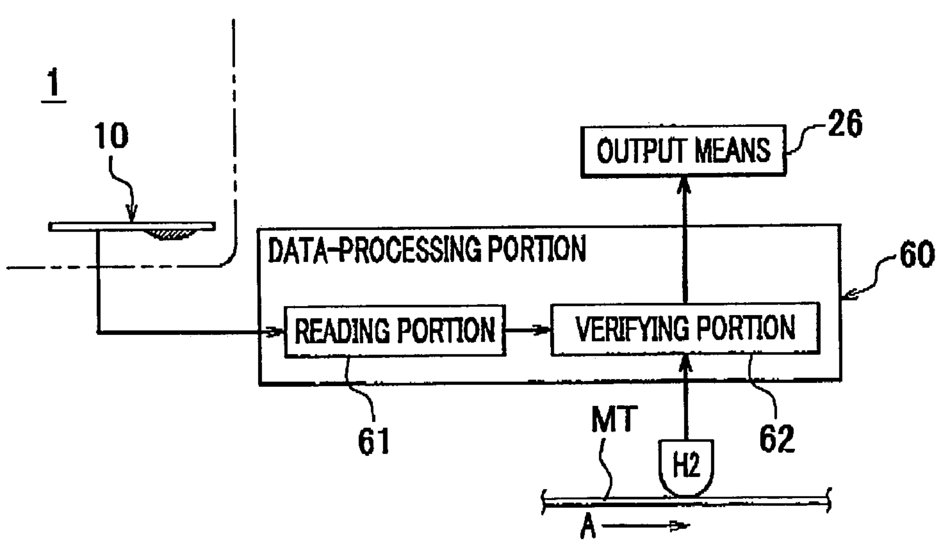
FIG. 4B is a block diagram showing a schematic view of the data-processing portion of a reproducing magnetic tape drive.

FIG. 4A is a block diagram showing a schematic view of a data-processing portion of a recording magnetic tape drive regarding the second embodiment of the present invention. FIG. 4B is a block diagram showing a schematic view of the data-processing portion of a reproducing magnetic tape drive.

In the following explanation, the components, which are the same as that of first embodiment, are indicated by the same symbols, and the brief explanation thereof will be omitted.

[Magnetic Tape Drive for Recording 2]

Next, amagnetic tape drive used for recording of data (herein after indicated as a recording magnetic tape drive) according to the second embodiment will be explained.

In the recording magnetic tape drive according to the present invention, the construction of the data-processing portion 50 and the numbers of the reading or writing head are mainly differing from those of the first embodiment.

As shown in FIG. 4A, a data-processing portion 50 comprises a reading portion 51 and a verifying portion 52.

The reading portion 51 obtains the ID number recorded on the cartridge memory 10. To be more precise, the reading portion 51 of this data-processing portion 50 performs the readout of the information stored in the cartridge memory 10 through the loop antenna 13 utilizing a non contact type data exchanging method. Then the reading portion 31 obtains the ID number among the obtained information, and outputs this ID number to the verifying portion 52.

The verifying portion 52 obtains the ID number recorded on to the magnetic tape MT through the reading head H1, and verifies whether or not the obtained ID number accords with the ID number entered form the reading portion 51. In other words, the verifying portion 52 checks whether or not the ID number of the magnetic tape MT agrees with the ID number recorded in the cartridge memory 10. If the obtained ID of the magnetic tape agrees with the ID number entered form the reading portion 51, the verifying portion 52 records the data entered from the input means 21 on the magnetic tape MT through the writing head H2.

[Operation of the Magnetic Tape Drive for Recording 2]

Here, a description will be made to explain a method of recording data on the magnetic tape cartridge 1 loaded on the recording magnetic tape drive according to the preset embodiment.

When the magnetic tape cartridge 1 is mounted on the recording magnetic tape drive and the traveling of the magnetic tape MT is started, the reading portion 51 of the data-processing portion 50 performs the readout of the information stored in the cartridge memory 10. On this occasion, the readout of the information is performed through the loop antenna 13 utilizing a non contact type data exchanging method. Then the reading portion 31 obtains the ID number among the obtained information, and outputs this ID number to the verifying portion 32. In this occasion, the reading head H2 reads ID number recorded on the front end of the magnetic tape MT. Then, the obtained ID number is outputted to the verifying portion 52.

Then, the verifying portion 52 checks whether or not the ID number entered from the reading head H2 accords with the ID number entered from the reading portion 51. If the ID number entered from the reading head H1 agrees with the ID number entered form the reading portion 51, the verifying portion 52 records the data on the magnetic tape MT through writing head H1. If the ID number entered from the reading head H1 does not agree with the ID number entered form the reading portion 51, on the other hand, the recording of the data on the magnetic tape MT is not performed.

[Magnetic Tape Drive for Reproducing 2]

Next, a magnetic tape drive used for reproducing of data (herein after indicated as a reproducing magnetic tape drive) according to the second embodiment will be explained.

In the reproducing magnetic tape drive according to the present invention, the construction of the data-processing portion 60 is differing from that of the first embodiment.

As shown in FIG. 4B, a data-processing portion 60 comprises a reading portion 61 and a verifying portion 62.

In the present embodiment's data-processing portion 60, the verifying portion 62 is provided. This verifying portion 62 connects with each of the output means 46 and the reading head H2.

[Operation of the Magnetic Tape Drive for Reproducing 2]

Here, the reproducing of the data recorded on the magnetic tape MT will be explained.

When the magnetic tape cartridge 1 is mounted on the reading magnetic tape drive, as shown in FIG. 4B, the reading portion 61 of the data-processing portion 60 performs the readout of the information stored in the cartridge memory 10 through the loop antenna 13 utilizing a non contact type data exchanging method Then the reading portion 61 obtains the ID number among the obtained information, and outputs this ID number to the verifying portion 62.

When the traveling of the magnetic tape MT is started in the recording magnetic tape drive, the reading head H2 reads ID number recorded on the front end of the magnetic tape MT and out puts the obtained ID number to the verifying portion 52.

Then, the verifying portion 52, checks whether or not the ID number entered from the reading head H2 accords with the ID number entered from the reading portion 61. If the ID number entered from the reading head H2 agrees with the ID number entered form the reading portion 61, the verifying portion 62 performs the readout of data on the magnetic tape MT and output the data to the output means 26. Thus, reproducing of the data on the magnetic tape is achieved. If the ID number entered from the reading head H1 does not agree with the ID number entered form the reading portion 51, on the other hand, the readout of the data on the magnetic tape MT is not performed.

As described above, if the cartridge memory 10 is not installed within the magnetic tape cartridge 1, the readout or the recording of the data with respect to the magnetic tape MT is not carried out. Thus, if the magnetic tape cartridge 1 and the cartridge memory 10 are treasured, separately, the security of the data in the magnetic tape MT can be improved.

Although there have been disclosed what are the patent embodiment of the invention, it will be understood by person skilled in the art that variations and modifications may be made thereto without departing from the scope of the invention is indicated by the appended claims.

For example, a following constitution is acceptable. The cartridge memory 10 has a predetermined shape for being accommodated in a predetermined magnetic tape cartridge 1 so that the cartridge memory 10 cannot be accommodated in any other magnetic tape cartridges except for a predetermined magnetic tape cartridge 1. Thereby, the magnetic tape drive can record and reproduce data in only the case when the cartridge memory 10 is accommodated in a predetermined magnetic tape cartridge 1. According to aforementioned constitution, ID number dose not have to be recorded on the cartridge memory 10, in the meantime, the magnetic tape drive only has to confirm whether the cartridge memory 10 is appropriately accommodated in the magnetic tape cartridge 1 or not. Consequently, a structure of the magnetic tape drive can be simplified.

What is claimed is:

1. A magnetic tape cartridge comprising: a magnetic tape; and a cartridge memory detachably attached to the magnetic tape cartridge for previously storing identification data that is externally, wirelessly read and written, wherein the identification data is readable from the cartridge memory attached to the magnetic tape cartridge to encipher information recorded on the magnetic tape with the identification data as key data and decipher the information from the magnetic tape with the key data, and wherein the magnetic tape cartridge and the cartridge memory hold first and second visual identifying indications indicative of a unique relation therebetween, respectively, to allow an operator to independently keep the magnetic tape and the detached cartridge memory and thereafter attach the cartridge memory again to the magnetic tape cartridge having the unique relation with the cartridge memory to decipher the information with the key data.

2. A magnetic tape cartridge according to claim 1, wherein a shutter is provided in such a manner as to open and close a opening.

3. A magnetic tape cartridge according to claim 2, wherein information, which indicates the correlation between said magnetic tape cartridge and said cartridge memory, is marked on said magnetic tape cartridge and said cartridge memory, respectively.

4. A magnetic tape cartridge according to claim 3, wherein a magnetic tape to be accommodated in said magnetic tape cartridge stores an enciphered data, which is obtained by an encipherment utilizing said unique identification data as a cryptographic key.

5. A magnetic tape cartridge according to claim 3, wherein a magnetic tape to be accommodated in said magnetic tape cartridge includes a unique identification data that is endemic to said magnetic tape, and wherein a recording of data on said magnetic tape is allowed if said unique identification data that is endemic to said magnetic tape agrees with said unique identification data that is endemic to said cartridge memory.

6. A magnetic tape cartridge according to claim 3, wherein a magnetic tape to be accommodated in said magnetic tape cartridge includes a unique identification data that is endemic to said magnetic tape, and wherein a reproducing of data from said magnetic tape is allowed if said unique identification data that is endemic to said magnetic tape agrees with said unique identification data that is endemic to said cartridge memory.

7. A magnetic tape drive used for recording data on a magnetic tape cartridge of claim 3, said magnetic tape drive comprising:

a data-processor, which enciphers data to be recorded on said magnetic tape by utilizing said identification data that corresponds to said cartridge memory, and obtains a enciphered data;

a writing head, which records said enciphered data on said magnetic tape;

a loading portion, said magnetic tape cartridge is mounted thereon; and a take-up reel, which winds said magnetic tape around it in order to draw out said magnetic tape from said magnetic tape cartridge and to guide said magnetic tape to said writing head.

8. A magnetic tape drive used for recording data on a magnetic tape cartridge according to claim 7, wherein said data-processor further comprising:

an reading portion, which obtains said unique identification data stored in said cartridge memory; and a enciphering portion, which enciphers data to be recorded on said magnetic tape by utilizing said identification data as a cryptographic key.

9. A magnetic tape drive used for recording data on a magnetic tape cartridge according to claim 7, wherein a unique identification data is previously recorded on said magnetic tape, and wherein said data-processor obtains said unique identification data recorded on said magnetic tape through a reading head, and said data-processor records said data on said magnetic tape if said unique identification data obtained through a reading head agrees with a unique identification data stored in said cartridge memory.

10. A magnetic tape drive used for reproducing data from a magnetic tape cartridge of claim 3, said magnetic tape drive comprising:

a reading head, which performs a readout of enciphered data recorded on said magnetic tape;

a data-processor, which deciphers said enciphered data by utilizing an unique identification data that corresponds to said cartridge memory, and obtains data;

a loading portion, said magnetic tape cartridge is mounted thereon; and a take-up reel, which winds said magnetic tape around it in order to draw out said magnetic tape from said magnetic tape cartridge and to guide said magnetic tape to said reading head.

11. A magnetic tape drive used for reproducing data from a magnetic tape cartridge according to claim 10, wherein said data-processor further comprising:

a reading portion, which obtains said unique identification data stored in cartridge memory; and a deciphering portion, which deciphers enciphered data by utilizing said unique identification data as a cryptographic key.

12. A magnetic tape drive used for reproducing data from a magnetic tape cartridge according to claim 10, wherein a unique identification data is previously recorded on said magnetic tape, and wherein said data-processor obtains said unique identification data recorded on a said magnetic tape through a reading head, and said data-processor outputs said data if said unique identification data obtained through a reading head agrees with said unique identification data recorded on said cartridge memory.

13. The magnetic tape cartridge according to claim 3, wherein information correlating the cartridge memory and the magnetic tape is visually marked on a surface of the cartridge memory and the magnetic tape.

* * * * *